United States Patent [19]
Toti

[11] 3,840,960
[45] Oct. 15, 1974

[54] APPARATUS FOR FORMING A STRUCTURAL UNIT

[76] Inventor: Andrew J. Toti, 311 W. River Rd., Modesto, Calif. 95351

[22] Filed: Feb. 1, 1973

[21] Appl. No.: 328,709

Related U.S. Application Data

[60] Continuation of Ser. No. 179,193, Sept. 9, 1971, abandoned, which is a division of Ser. No. 888,717, Dec. 29, 1969, abandoned.

[52] U.S. Cl............................. 29/200 B, 29/155 C
[51] Int. Cl...................... B23p 19/00, B23p 17/00
[58] Field of Search.......... 29/200 B, 208 D, 155 R, 29/505, 155 C

[56] References Cited
UNITED STATES PATENTS

| | | | |
|---|---|---|---|
| 3,208,140 | 9/1965 | Mayrath | 29/505 |
| 3,337,944 | 8/1967 | Mrris | 29/200 B X |
| 3,505,719 | 4/1970 | O'Malley et al | 29/200 B |
| 3,722,052 | 3/1973 | Toti | 29/155 R |

*Primary Examiner*—Thomas H. Eager
*Attorney, Agent, or Firm*—Flehr, Hohbach, Test, Albritton & Herbert

[57] ABSTRACT

Apparatus for forming a structural unit, such as a structural beam comprised of a pair of opposed metal extrusions having preformed slot structures extending therealong in which edge portions of a pair of opposed sheet metal side wall members are secured by deforming certain of such members relative to the others so that secure interconnection is effected without requiring separate fasteners. The assembly machine disclosed employs predetermined lengths of the metal extrusions which are joined with substantially continuous lengths of sheet metal side wall panels into a unitary assembly which is subsequently cut to a predetermined length determined generally in accordance with the length of the extrusions employed.

46 Claims, 27 Drawing Figures

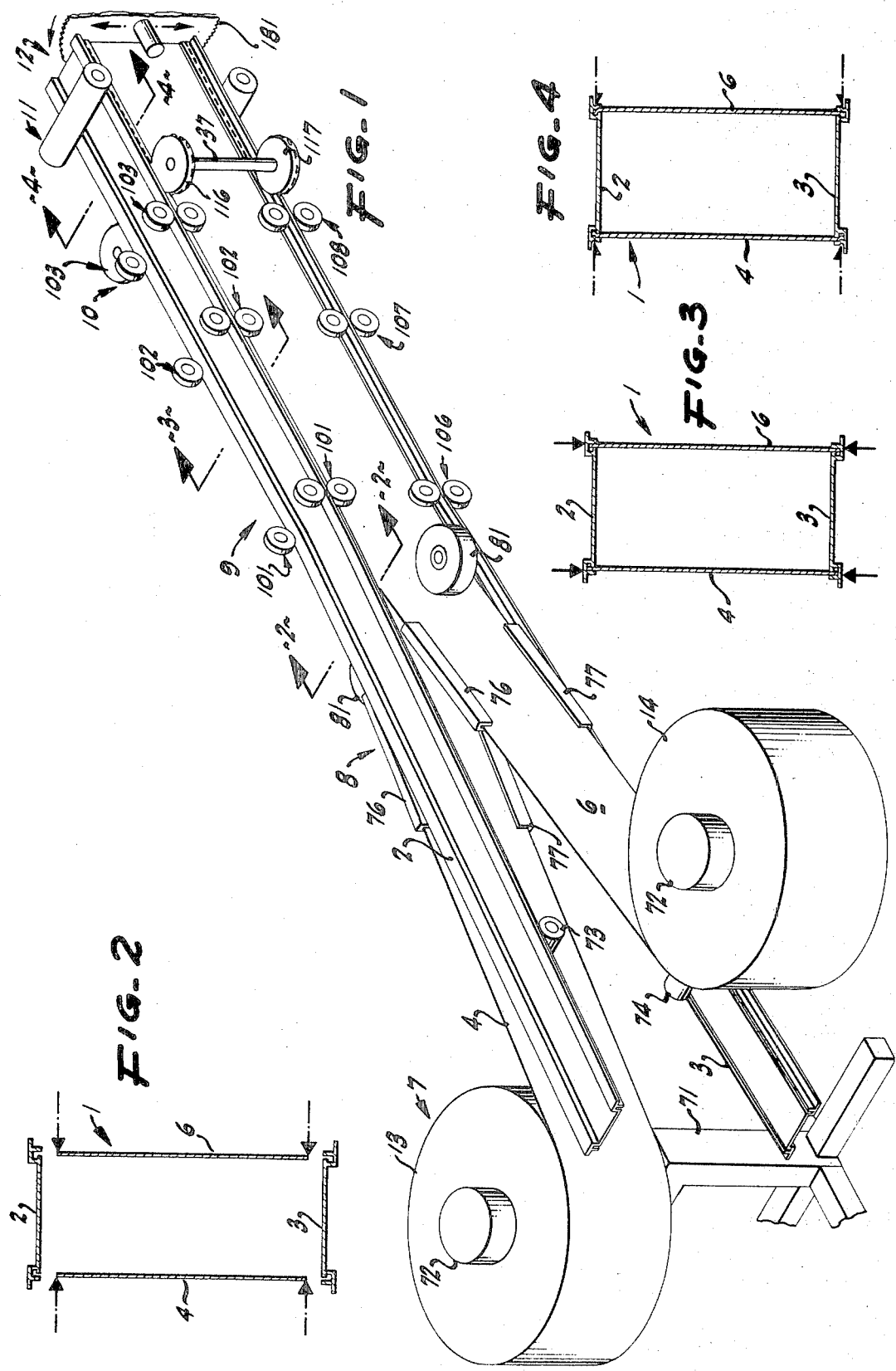

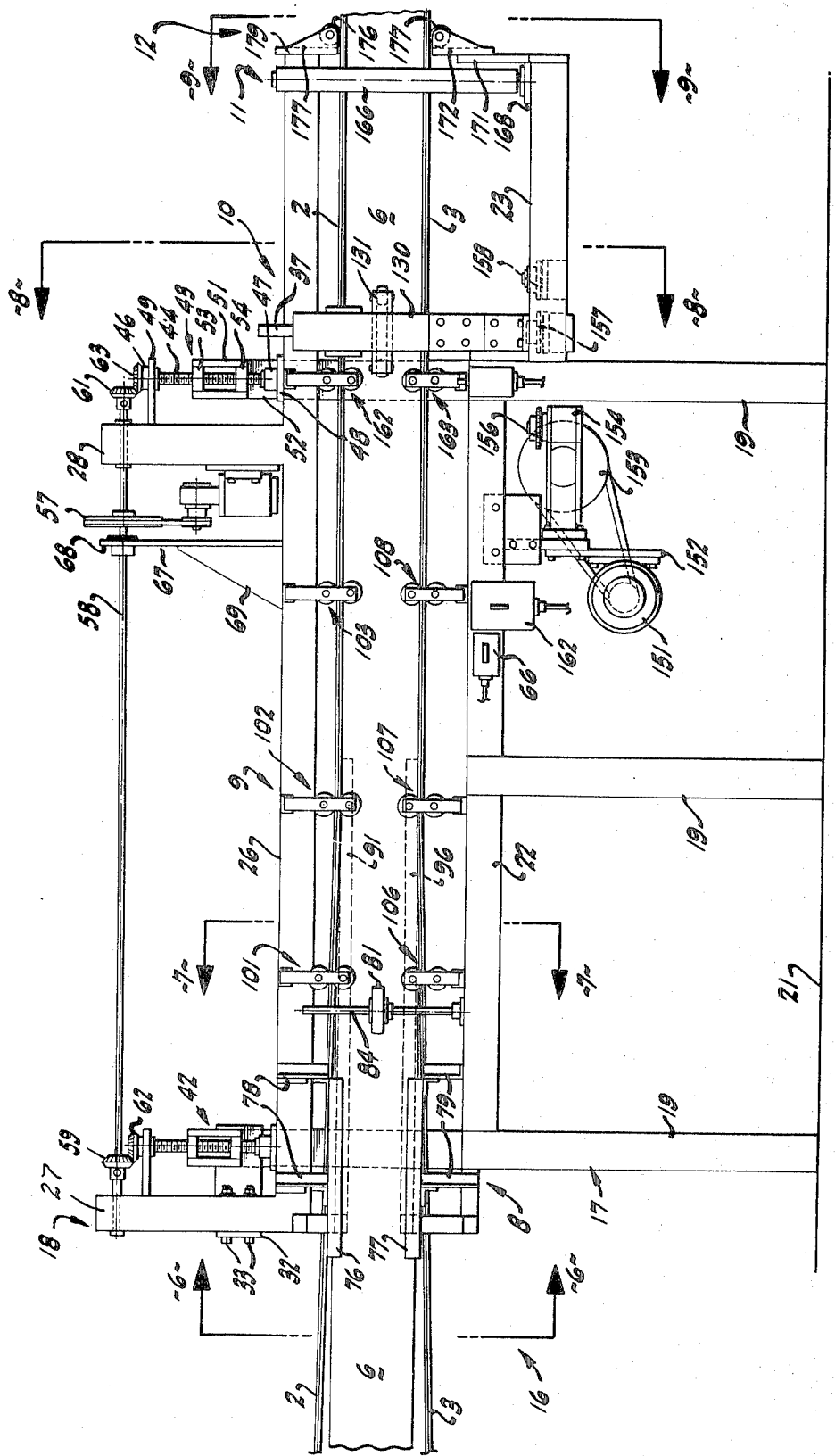

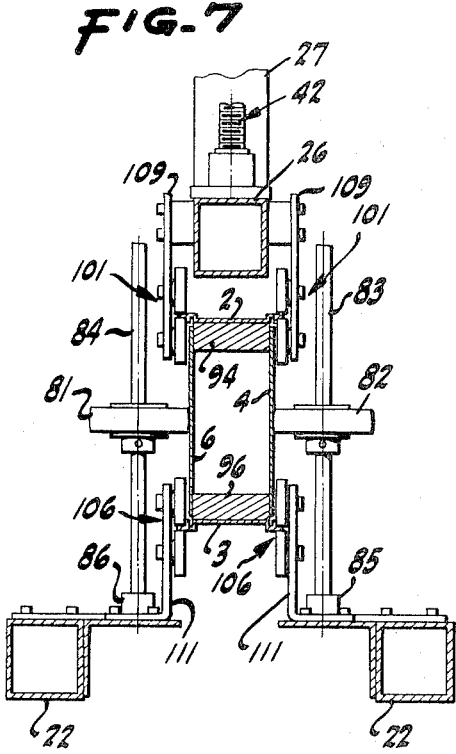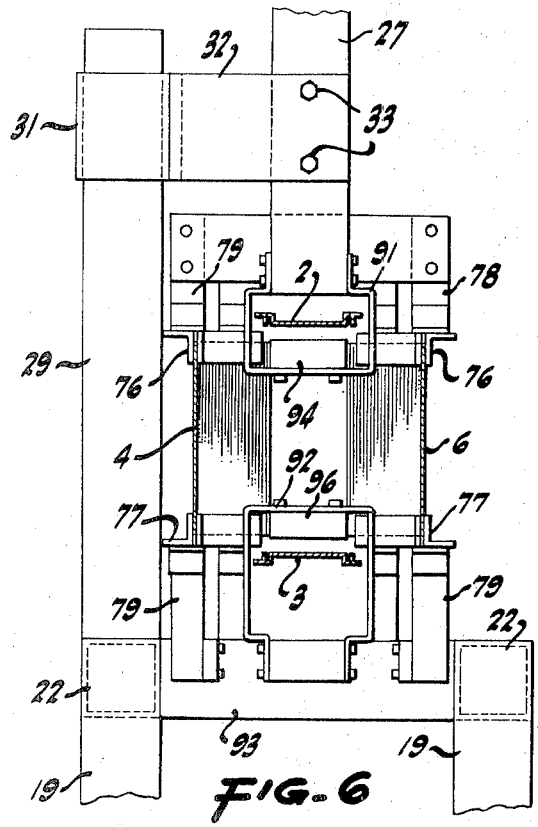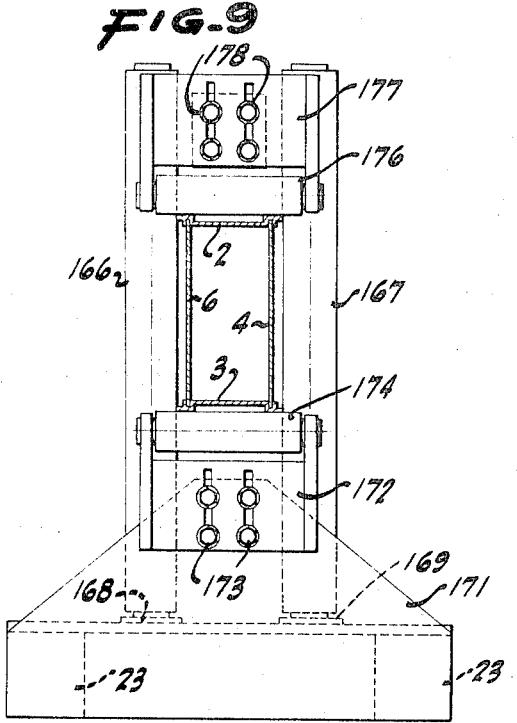

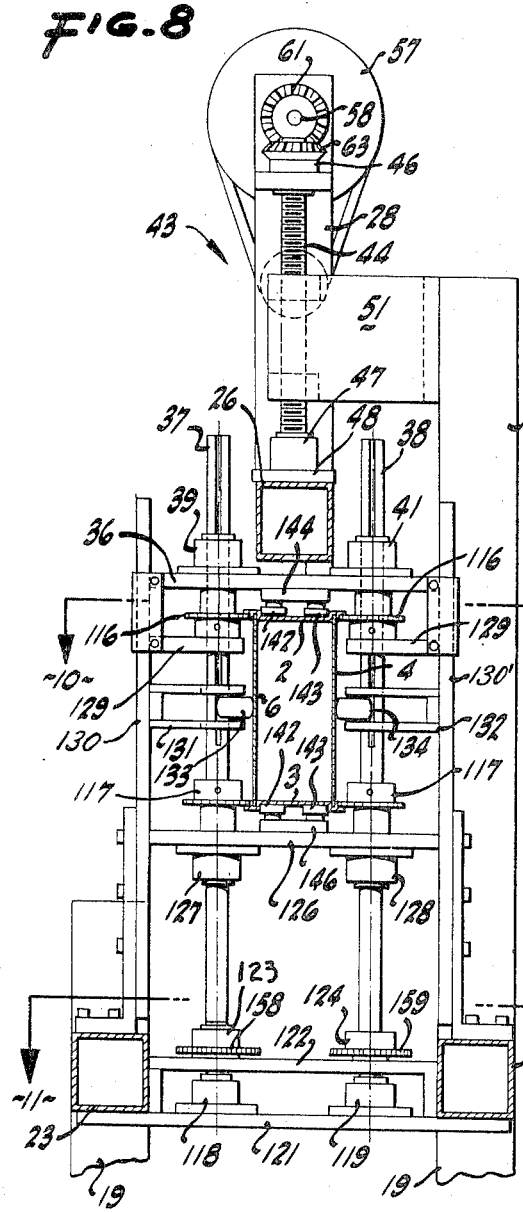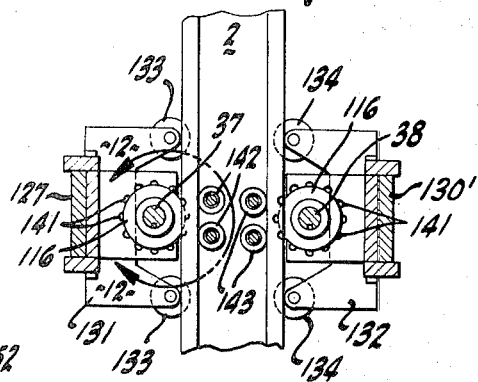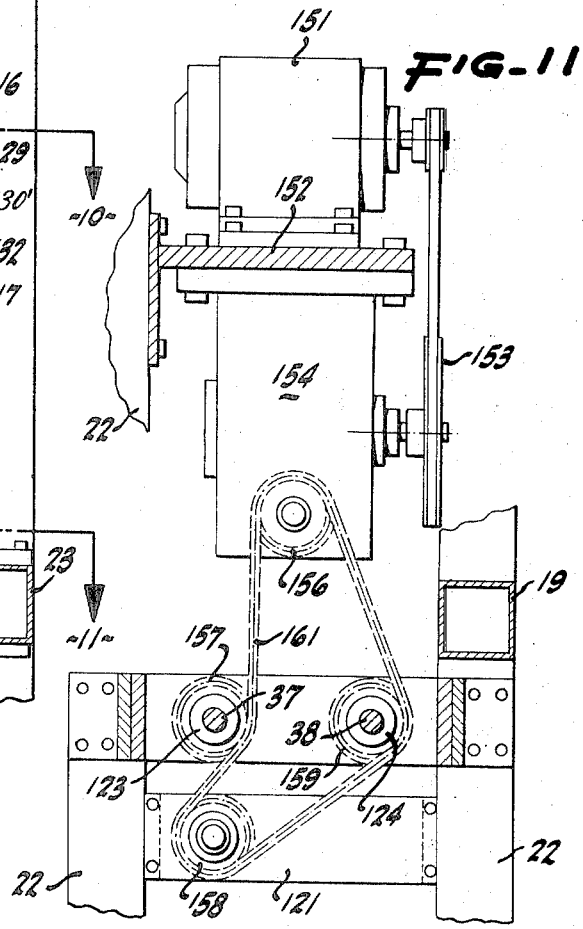

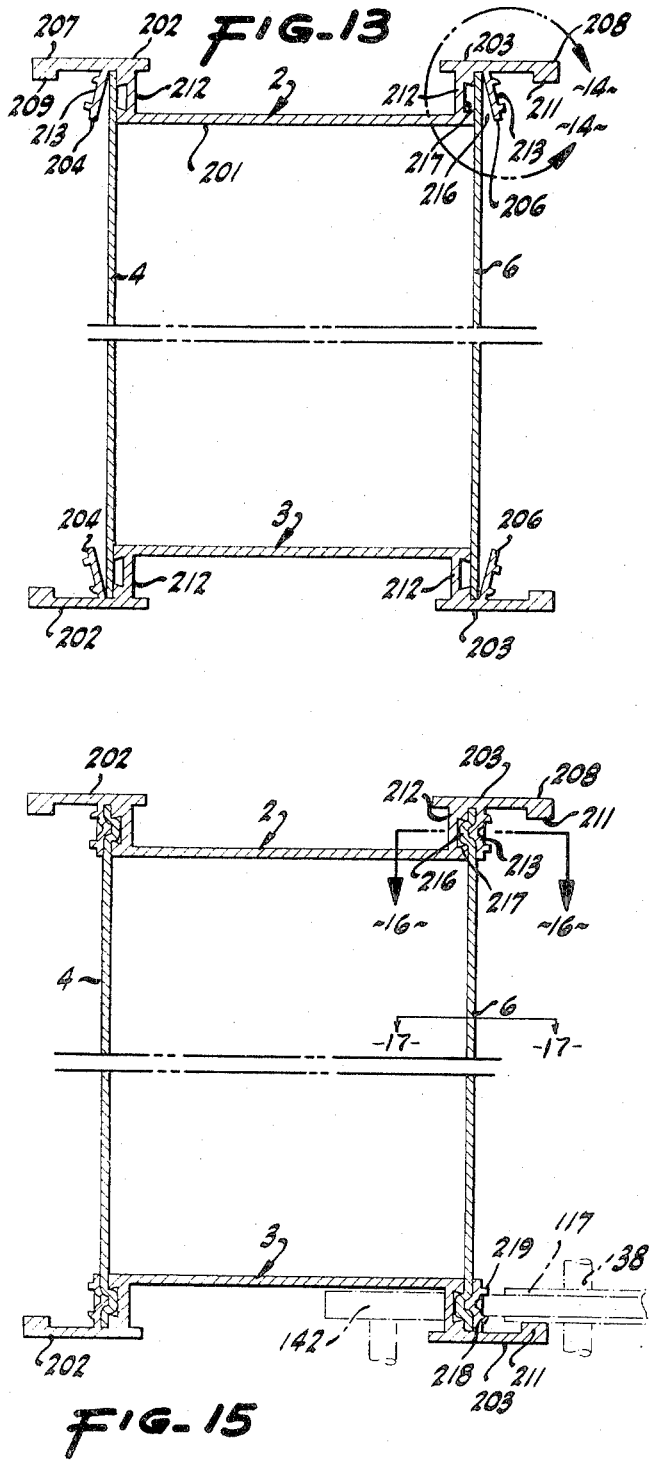
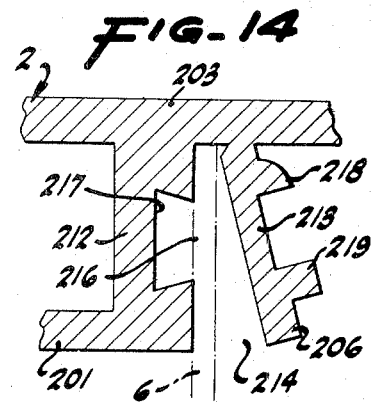
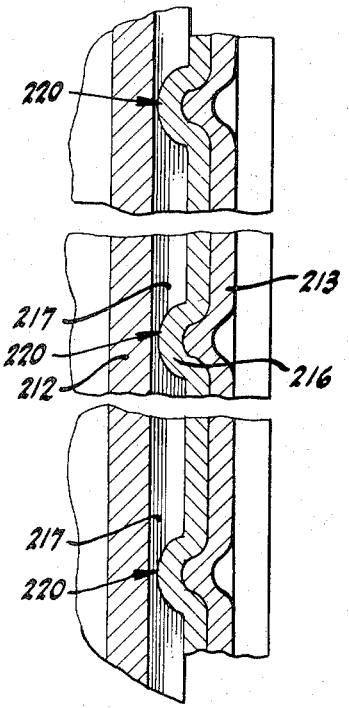

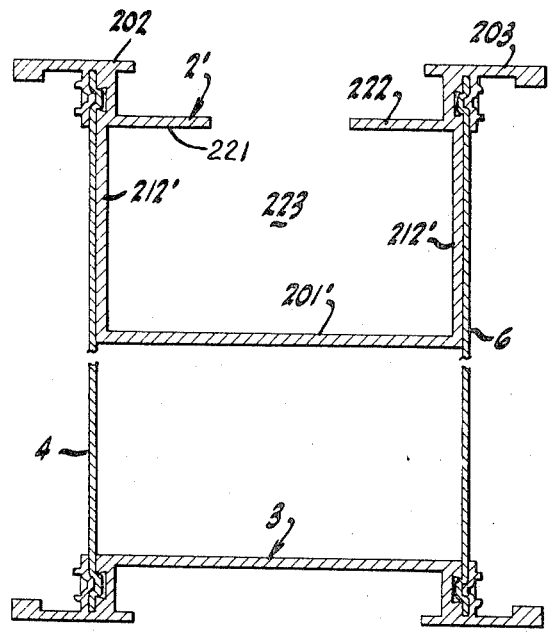
FIG.-18
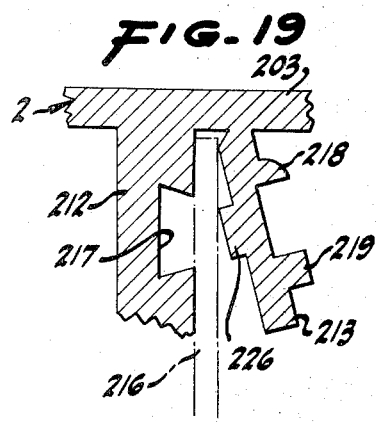
FIG.-19
FIG.-17
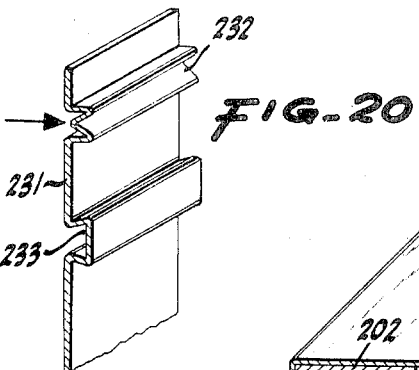
FIG.-20
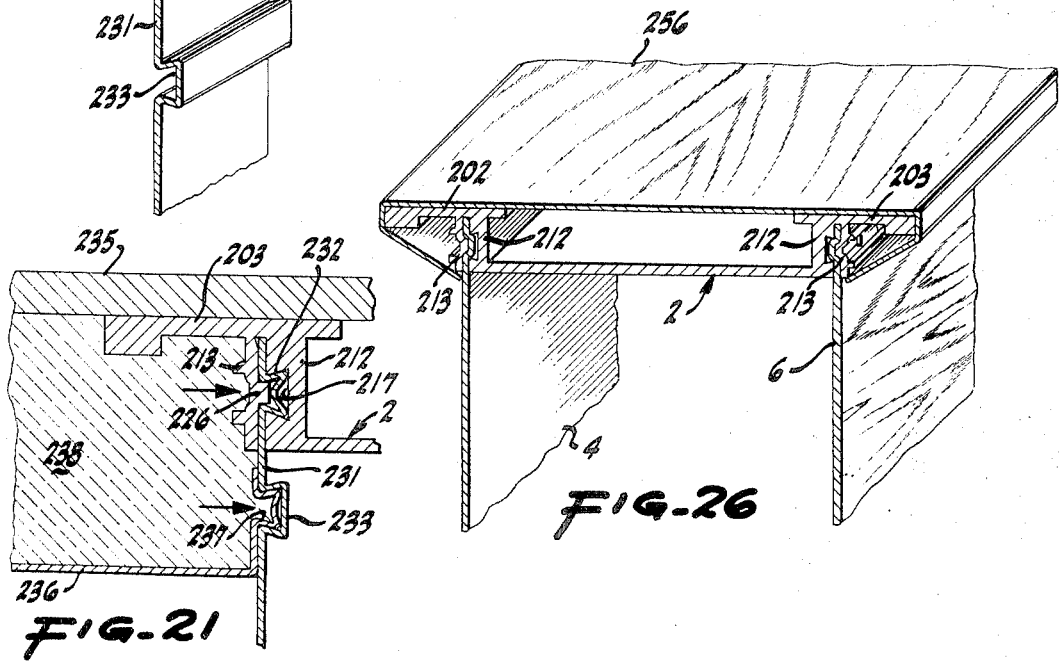
FIG.-21
FIG.-26

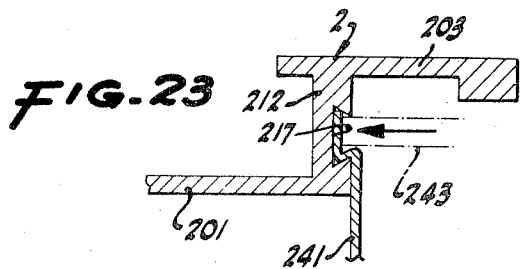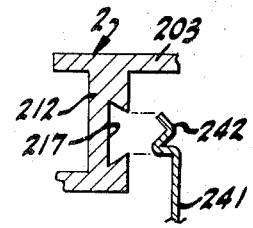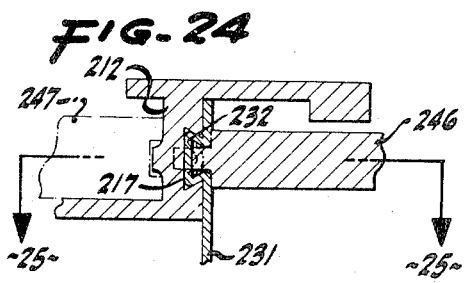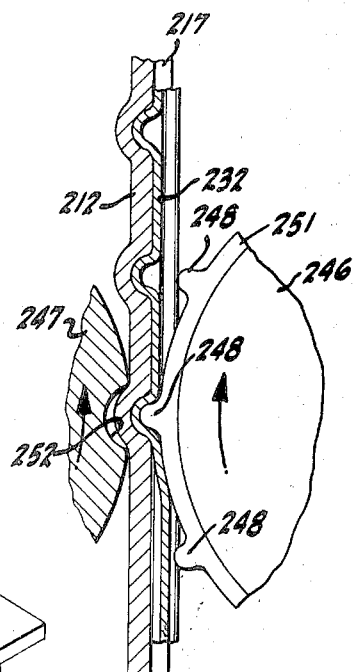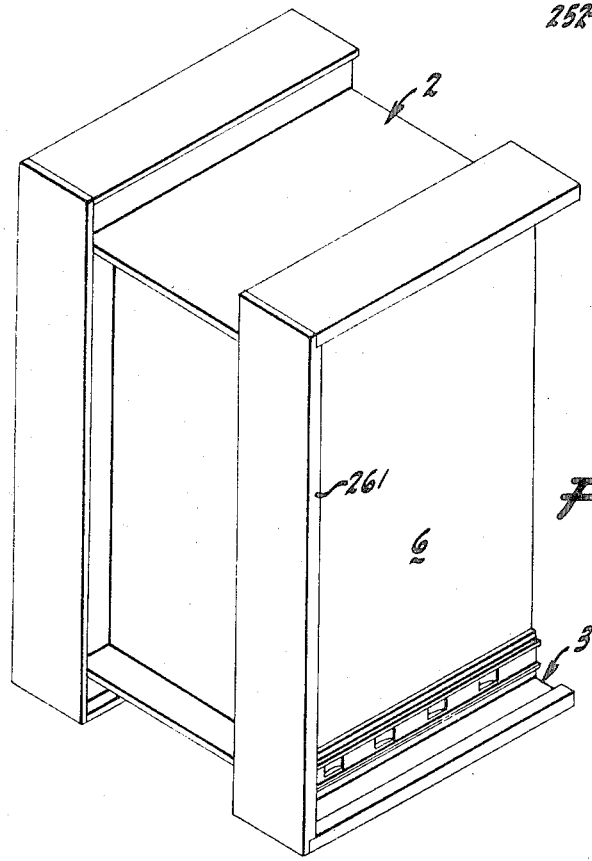

APPARATUS FOR FORMING A STRUCTURAL UNIT

This application is a continuation of application Ser. No. 179,193, filed Sept. 9, 1971, now abandoned, which is a division of application Ser. No. 888,717, filed Dec. 29, 1969, now abandoned.

BACKGROUND OF THE INVENTION

1. Field of the Invention

This invention relates to structural beam units and to the method and apparatus for producing same. More particularly, this invention relates to an improved apparatus for forming metal building beam to be used for supporting patio covers, canopies, roofs of screened-in porches and outdoor rooms, carports, and like building structures. Still more particularly, this invention relates to an apparatus for manufacturing strong, light weight structural units, such as hollow metal building beams, in which separate fasteners are not required to secure together the respective structural components which cooperate to define the beam assembly.

2. Description of the Prior Art

Light weight hollow metal building beams have been known generally in the art heretofore. However, so far as is known, the structural beam construction, and the method and machine for manufacturing the same, as disclosed herein has not been utilized heretofore. Nor, so far as is known, have a pair of opposed sheet metal wall panels been unitarily joined with a pair of opposed preformed metal extrusions by deforming predetermined segments of at least one pair of the opposed pairs of members into locking engagement with the members of the other of said pairs so that the members are securely locked together into a unitary, rigid, high strength and light weight assembly. The present beam construction is designed to be manufactured in predetermined lengths at a factory or on the job site by utilizing the improved mechanisms of the machine disclosed herein.

Light weight and strong beams of the type generally known in the art heretofore are characterized by the U.S. Pat. Nos. to Toti et al. 3,134,468 dated May 26, 1964; Toti et al. 3,224,154 dated Dec. 21, 1965, and Toti 3,332,179 dated July 25, 1967. However the respective beams disclosed in such patents and in the prior art of record thereagainst, do not employ the improved features of the present beam structure, nor are the present beam assembly method and apparatus disclosed or suggested therein.

SUMMARY OF THE INVENTION

The present invention relates to an improved light weight structural unit, and to a method and apparatus for producing the same. More particularly this invention relates to an improved apparatus for forming and assembling a structural unit, such as a metal structural beam of elongated, generally rectangular, hollow configuration which may be formed straight or with a predetermined amount of curvature to meet particular design or structural needs.

Still more particularly, this invention relates to an apparatus for forming a structural beam assembly produced from two opposed pairs of metal members, two of which are defined by generally rigid metal extrusions and the other two of which are defined by generally flexible sheet metal panels securely locked in interengagement with the extruded members. Still more particularly, this invention relates to an improved method for uniting pairs of structural members into a metal beam by employing segments of the structural members themselves to effect such interconnection so that separate fasteners are not required.

From the foregoing, it should be understood that objects of this invention include the provision of an apparatus for forming a structural unit defined by opposed pairs of structural members integrally connected with each other without requiring separate fasteners for such interconnection; the provision of a substantially continuous procedure for interconnecting and forming a plurality of structural units from a supply of discrete structural members, and to an improved machine for effecting such interconnection; and to the provision of an improved assembly machine which is adjustable to produce beams of varying sizes to meet various structural requirements. These and other objects of this invention will become apparent from a study of the following detailed disclosure in which reference is directed to the appended drawings.

DESCRIPTION OF THE DRAWINGS

FIG. 1 is a generally schematic view illustrating the assembly sequence by which the subject structural unit is produced from a plurality of discrete structural members.

FIGS. 2, 3 and 4 are cross sectional views of the structural unit at various stages of the assembly procedure taken in the planes of lines 2—2, 3—3 and 4—4 respectively of FIG. 1.

FIG. 5 is a side elevational view of the improved machine for assembling the subject structural unit.

FIGS. 6, 7, 8 and 9 are vertical sectional views through the subject machine taken in the planes of lines 6—6, 7—7, 8—8, and 9—9 respectively of FIG. 5.

FIG. 10 is a horizontal sectional view through a portion of the machine taken in the plane of line 10—10 of FIG. 8.

FIG. 11 is a horizontal sectional view through a portion of the machine taken in the plane of line 11—11 of FIG. 8.

FIG. 12 is a plan view, partly in section, of a portion of the machine taken generally within the confines of line 12—12 of FIG. 10 on an enlarged scale relative thereto.

FIG. 13 is a sectional view through the subject beam showing the opposed pairs of structural members thereof interengaged prior to rigid interconnection thereof.

FIG. 14 is an enlarged view of a portion of two interengaged structural members, one being shown in phantom lines, taken within the confines of line 14—14 of FIG. 13 on an enlarged scale relative thereto.

FIG. 15 is a sectional view corresponding generally to FIG. 13 but showing the structural members rigidly and integrally interconnected.

FIG. 16 is a horizontal sectional view through the assembled beam taken in the plane of line 16—16 of FIG. 15.

FIG. 17 is a horizontal sectional view through a portion of one of the side wall panels of the beam taken in the plane of line 17—17 of FIG. 15.

FIG. 18 is a sectional view through a modified embodiment of the subject beam corresponding generally to the showing of FIG. 15.

FIG. 19 is a view corresponding generally to the showing of FIG. 14 but illustrating a further modified embodiment of the subject beam.

FIG. 20 is an isometric view of a modified side wall structural member of the beam.

FIG. 21 is a sectional view illustrating a building roof as cover assembly utilizing the modified side wall member of FIG. 20.

FIG. 22 and 23 are before and after views of a further modified embodiment of the subject beam.

FIG. 24 is a vertical sectional view through a further modified embodiment of the subject beam and that portion of the apparatus designed to assemble the same.

FIG. 25 is a horizontal sectional view through the modified embodiment of FIG. 24 taken in the plane of line 25—25 thereof.

FIG. 26 is an isometric view of an assembled beam of the type seen in FIG. 15 showing a decorative cover panel attached therewith.

FIG. 27 is an isometric view of a beam of the type shown in FIG. 15 with a decorative panel attached therewith.

DESCRIPTION OF THE PREFERRED EMBODIMENTS

The beam structural unit of the present invention differs principally from the units shown in the aforementioned Toti patents in that the beams of such patents were specifically designed to be assembled on the job by unskilled labor without requiring special tools or the like to effect such assembly. In contrast, the present beam is designed to be assembled in a factory or at the job site utilizing specially designed machinery to join together the respective beam structural member components in a fashion which precludes their disassembly without destruction thereof. While the beams of the aforementioned patents perform effectively the purpose intended therefore, the present beam has been found to have increased strength advantages without substantial increase in weight. Thus, a more sturdy beam construction may be effected in a relatively inexpensive and substantially continuous operation in which a series of beams may be formed end to end with successive beams being severable from each other into predetermined lengths.

While hereinafter reference is directed to several embodiments of the subject structural unit, it should be understood that each embodiment employs the novel concept of utilizing segments of the respective beam structural members as the means for rigidly and securely interconnecting opposed pairs of such structural members into a unitary strong and light weight assembly, whereby separate connecting fasteners are obviated.

Utilization of the subject beam in a particular type building construction has not been illustrated herein. However, it should be understood that the same may be employed in any structural arrangement desired, such as to support a patio cover or canopy, carport, roof of an outdoor room or screened in porch, and the like, in known fashion. In that regard, the present beam may be employed in arrangements such as those shown in the aforementioned Toti patents, by way of example but without intending to be restrictive on such utilization thereof.

Before describing in detail the structural features of the subject beam and the machine for assembling the same, reference is directed to FIGS. 1 through 4 which illustrate general details of one embodiment of the beam and of the assembly machine in conjunction with a schematic showing of the method steps employed in forming a plurality of discrete structural members into an integral structural unit. In that regard, the illustrated embodiment of the beam, generally designated 1, comprises a pair of opposed structural members 2 and 3 which define the top wall and bottom wall of the beam, and a second pair of opposed structural members 4 and 6 which define the opposite side walls thereof.

In the preferred embodiments disclosed herein, the top and bottom structural members 2 and 3 are defined by elongated metal extrusions, preferably of aluminum or a suitable aluminum alloy of the type known in the trade having sufficient strength to perform the purpose intended therefor. Such extrusions are generally rigid in the longitudinal and transverse directions and preferably are preformed to predetermined lengths in accordance with the overall length of the beam to be formed therefrom.

The side walls 4 and 6 of the beam preferably are formed from generally resilient panels of sheet metal, such as aluminum or aluminum alloy of the type known in the trade having strength sufficient to perform their intended function. To enhance the strength of the panels 4 and 6, the same may be provided with generally parallel corrugations of suitable size and spacing as will be described hereinafter, such corrugations preferably being arranged to extend vertically between the top and bottom members 2 and 3 to define rigid reinforcing channels which resist collapsing of the beam in the vertical direction.

As shown progressively from the illustrations of FIGS. 2 through 4, the opposed pairs of structural members are brought in converging paths into contact with each other so that edge portions of the side wall panels 4 and 6 are inserted into preformed slot structures provided along opposite margins of the extrusions 2 and 3. Upon such interengagement being effected, inward pressure is applied to the extrusions 2 and 3 to insure that the edge portions of the side wall panels remain within the slot structures, as will be described hereinafter in greater detail. Then lateral pressure is applied to the members to deform predetermined segments of the members of at least one of said pairs into locking engagement with the members of the other of said pairs so that the edge portions of the side wall panels 4 and 6 are securely locked within the slot structures of the extrusions 2 and 3.

In the beam embodiment shown in FIGS. 2 through 4, the slot structures formed in the extrusions 2 and 3 are deformed together to clamp or lock the edge portions of the side wall panels 4 and 6 therein. In alternative embodiments also described herein, under certain circumstances the edge portions of the side wall panels 4 and 6 may be deformed, and in further alternate embodiments both the slot structures and the edge portions of the side wall panels may be deformed, depending upon the type of interlock desired between the respective structural members. In any event, however, upon such deformation being effected, the structural members are securely interlocked together to define a strong, rigid, light weight beam having a generally rectangular cross section and hollow interior which is available to receive therein electrical conduits and the like, depending upon the end use intended for the completed beam.

Referring now to FIG. 1, the principal components of the apparatus for assembling the beam will be described in conjunction with the schematic procedure shown in such figure. The infeed end of the machine is defined by a supply station generally designated 7 from which the structural members are withdrawn in converging paths in accordance with a predetermined plan. Adjacent the supply station is a guide and assembly station generally designated 8 at which the opposed pairs of members are interengaged with each other in the manner shown in FIG. 2. Adjacent the guide and assembly station 8 is a pressure station generally designated 9 at which inward pressure is applied to the respective components in the fashion shown in FIG. 3 prior to passage of the interengaged components to a deforming station generally designated 10 at which the components are integrally locked with each other. A second pressure station generally designated 11 is provided adjacent the deforming station 10 to impart curvature to a completed beam if desired. Finally, a cut off station generally designated 12 is provided adjacent to the discharge end of the machine at which the various structural members of the beam withdrawn from a continuous supply may be severed to impart the beam with a predetermined length.

It will be noted from FIG. 1 that the respective stations are positioned in line with each other so that the components may be successively formed from separate structural members into a unitary assembly which can be separated only by destructive distortion thereof.

It will further be noted from FIG. 1 that the integral structural unit of this invention is formed by employing a method in which a plurality of discrete structural members of like opposed pairs are provided, the members of a first pair including preformed slot structures extending longitudinally along opposite margins thereof. Such opposed pairs of members are brought into contact with each other at a guide assembly station at which edge portions or margins of the second pair of members are inserted into the slot structures of the first pair of members at such station. The respective members are fed from supplies thereof with the extruded members 2 and 3 being drawn from precut lengths thereof while the sheet metal side wall members 4 and 6 are withdrawn from substantially continuous rolls 13 and 14 thereof.

After the respective structural members have been drawn into interfitting engagement with each other, pressure is applied thereto to hold the members assembled, and thereafter the members are selectively deformed into locking contact with each other. In those embodiments in which a curvature is desired, such curvature is imparted to the beam after interlocking of the members has been effected which results in a predetermined amount of arch being imparted to the completed beam. In that regard, while the amount of curvature may be varied selectively it has been found that some slight amount of curvature in all beams is preferred to compensate for loading of the beams when the same are utilized in building structures. In that regard, a curvature or deflection of approximately ½ inch to ¾ inch for each 20 foot beam length is desirable. However, if additional curvature is desired for design appearance, for example to give a noticeable arched configuration to a roof or ceiling being supported by the beam, a curvature of from 5 to 6 inches for each 20 foot beam length can be effected.

Following assembly of a beam to its desired configuration, the same is cut to a predetermined length, generally determined in accordance with the predetermined length of the preformed structural members 2 and 3. In that regard, any suitable cut off mechanism, such as one or more rotary saw blades of the type illustrated schematically in FIG. 1 at cut off station 12, may be employed.

It will additionally be noted from FIG. 1 that an important feature of this invention which facilitates assembly of the structural members into interengagement with each other is the fact that the members are fed from the supplies thereof in converging paths which simplify introduction of edge portions of the side wall panels 4 and 6 into the preformed slot structures of the top and bottom wall structural members 2 and 3.

Having thus summarized the assembly method utilized for the various embodiments of the structural beam disclosed herein, reference is directed to FIGS. 5 through 11, taken in conjunction with the schematic showing of FIG. 1, for a detailed description of the apparatus developed to assemble structural beams in the manner summarized above.

The preferred embodiment of the machine illustrated is generally designated 16 and comprises two operative sections, namely, a fixed lower section 17 and an operatively discrete upper section 18 which is adjustably movable relative to the lower section. Such adjustable capability permits the subject machine to fabricate beams of varying sizes, such as beams ranging, by way of example, from 5 inches to 12 inches in spacing between the planes of the top and bottom structural members 2 and 3 thereof.

As best seen in FIG. 5, the lower machine section 17 comprises a rigid supporting framework defined by a plurality of longitudinally spaced pairs of laterally spaced vertically extending legs 19 engageable with a suitable supporting surface 21 in a manufacturing factory or the like. The framework is completed by a series of laterally spaced longitudinally extending horizontal frame members 22, and horizontal extensions thereof 23 at the discharge end of the machine. The respective legs 19 and frame members 22 and 23 are joined together in any suitable fashion, such as by welding, into a rigid supporting framework upon which the operative components of the machine are mounted.

The upper section 18 of the machine includes a rigid unitary framework defined by a longitudinally extending horizontal frame member 26 which extends substantially the full length of the machine between the infeed end and discharge end thereof. Frame member 26 is mounted for vertical adjustable movement relative to the framework of the lower section 17 of the machine. Adjacent opposite ends of frame member 26 are secured upwardly projecting vertical frame members 27 and 28 with which means for moving the upper section of the machine vertically relative to the lower section thereof are operatively connected as will be described.

Adjacent the infeed end of the machine, a vertical frame member extension 29 projects upwardly from the lower framework and is secured thereto by welding or the like, as seen in FIG. 4. Positioned on the frame extension 29 adjacent its top is a collar 31 which surrounds the member 29 and is vertically slidable thereon. Projecting laterally from the collar and secured thereto by welding or the like is a connecting plate 32 which is secured, such as by a series of nut and bolt assemblies 33, to the upright frame member 27 mentioned previously. The vertical frame extension 29 thus serves as a guide for collar 31 so that the vertical frame member 27 and its associated frame member 26 may be moved vertically relative to the lower machine framework.

Adjacent the discharge end of the machine, the upper machine section 18 is supported for vertical adjustable movement by means of a transverse mounting plate 36 (FIG. 8) secured in any suitable fashion to the underside of the upper frame member 26. Extending through plate 36 in a manner to be described in greater detail hereinafter are a pair of upright rotatable drive shafts 37 and 38 which also serve as guide shafts for the upper machine section. In that regard, bearings 39 and 41 respectively are secured to the mounting plate 36 and such bearings permit rotation of the respective shafts without interferring with longitudinal movement of such bearings and plate 36 and other structures supported thereby.

Adjustment means for moving the upper machine section relative the lower section of the machine, identified as 42 and 43 respectively, are provided adjacent opposite ends of the machine and are operatively interposed between the respective upright frame members 27 and 28 and the horizontal frame member 26. Such adjusting means are essentially identical and therefore the details of only one thereof will be described with similar reference numerals identifying similar parts of each. Taking reference to means 43 shown in FIGS. 5 and 8, such means comprise mechanism for drawing the horizontal frame member 26 towards or moving the same away from the lower framework of the machine. Such mechanism comprises an upright worm member 44 having mounting bearings 46 and 47 at opposite ends thereof. Lower bearing 47 is secured to a support plate 48 which is welded or otherwise secured to the frame member 26. Upper bearing 46 is mounted on a support plate 49 which is secured to and projects from the upright frame member 28.

Interposed between the opposite ends of the worm 44 is a bracket 51 secured to an upright extension 52 (FIG. 8) of the lower framework of the machine. In the bracket are mounted a pair of spaced nut members 53 and 54 through which and with which the worm is threadedly engaged. Thus, upon rotation of the worm in one direction, frame member 26 and the components supported thereby may be drawn downwardly; upon rotation of the worm in the opposite direction frame member 26 and the components mounted thereon may be drawn upwardly.

The opposite adjusting means 42 is similarly constructed and is driven in conformity with operation of adjusting means 43 so that the upper section of the machine may be adjusted precisely and uniformly in complete parallelism as required to permit beams of predetermined dimensions to be accurately assembled. In that regard, drive means for simultaneously actuating the respective worm mechanisms 42 and 43 is provided which is driven from a central power source, such as an electric motor 56 secured to the frame member 28. By means of a pulley and belt assembly 57 the motor actuates an elongated drive shaft 58 which extends substantially the length of the machine and is journalled in the upright frame members 27 and 28.

Drive shaft 58 carries thereon spaced bevel gears 59 and 61 which mesh with other bevel gears 62 and 63 secured to the respective worm members of the adjusting mechanisms 42 and 43. Electric motor 56 possesses reversible capability which permits the drive shaft 58 to be rotated in a preselected direction to advance or retract the worm members to raise or lower the upper section of the machine on the guide means provided therefor. A suitable control, generally designated 66, is provided at an operator's station (FIG. 5) for selectively actuating the motor 56 in the direction chosen in known fashion. Preferably such control includes fine adjustment capability which permits the worm mechanisms 42 and 43 to be precisely adjusted to the exact locations desired.

To provide additional support for the drive shaft 58, an upright mounting plate 67 (FIG. 5) is provided having a bearing 68 therein through which the drive shaft rotates. Plate 67 is secured by means of braces 69 to the horizontal frame member 26 of the upper machine section.

When the upper machine section has been adjusted to the predetermined spacing required to effect assembly of a structural unit of predetermined size, the machine is ready to accept therein the opposed pairs of beam components 2, 3, 4 and 6 being assembled.

At the aforementioned supply station 7, as best seen in FIG. 1, means are provided for supporting the respective beam components as they are being introduced into the machine. Each of the supporting means for the rolls 13 and 14 of the side panel members 4 and 6 comprises an upright standard 71 from which a vertical axle 72 extends through the core of the respective rolls. Such supporting means further includes rollers 73 and 74 vertically spaced from each other past which and in contact with which the respective top and bottom structural members 2 and 3 pass as they enter the machine. The rollers 73 and 74 are supported by standards of any suitable construction (not shown) is spaced relationship to each other to insure a converging path of travel of the structural members 2 and 3 relative to each other as they enter the machine.

In that latter regard, at the guide and assembly station 8, structure is provided for receiving the respective pairs of structural members from the supplies thereof and bringing the same together in the converging path noted. Such guide structure, as seen in FIGS. 5 and 6, includes laterally spaced upper and lower pairs of guide tracks 76 and 77 respectively through which opposed upper and lower edge portions of the respective side wall panels 4 and 6 pass into the machine from their supply rolls 13 and 14. The respective guide tracks are defined by closely spaced guide plates defining a guide channel therebetween. The guide tracks are secured to the respective upper and lower sections of the machine by means of spaced mounting brackets 78 and 79 respectively which in turn are secured to upper and lower frame members of the machine section as perhaps best seen in FIG. 6.

The guide tracks converge downwardly and inwardly relative to each other so that the side wall panels 4 and 6 are fed in the converging path noted previously. In that regard, roller means are provided at opposite sides of the beam assembly being formed as seen in FIGS. 5 and 7 which engage the side wall panels 4 and 6 to further insure intermeshing of the respective structural components of the beam. Such roller means comprise a pair of laterally spaced rubber or like rollers 81 and 82 adjustably mounted on a pair of upright supporting shafts 83 and 84 which in turn are supported at their lower ends by bearings 85 and 86 on mounting plates secured to the frame members 22 of the lower machine section. The outer peripheries of the respective rollers 81 and 82 as seen in FIG. 7 are spaced from each other a distance corresponding to the dimension desired for the completed beam assembly.

The beam component guide means also includes guide structure for feeding the top and bottom structural members 2 and 3 in a converging path into engagement with the side wall panel members 4 and 6. In that regard, as seen in FIGS. 6 and 7, the latter guide structure includes a pair of generally U-shaped brackets 91 and 92 which respectively depend from the upright frame member 27 of the upper machine section and project upwardly from a transverse frame member 93 which extends between the longitudinal frame members 22 of the lower machine section. Such brackets are secured by bolting or the like to the frame members noted.

Secured by bolting or the like to the respective brackets 91 and 92 are elongated guide bars 94 and 96, of wood or other suitable material, which extend longitudinally of the machine into the beam being assembled. Such guide bars serve the dual purpose of preventing lateral movement of the side wall panels 4 and 6 inwardly relative to each other to an excessive amount while at the same time serving as guide surfaces over which the top and bottom structural members 2 and 3 may pass into contact with the upper and lower edge portions of the respective side wall panel members. Thus, as the aforementioned guide rollers 81 and 82 urge the side wall panels 4 and 6 inwardly towards each other, guide bars 94 and 96 limit such inward movement in the manner best seen in FIG. 7.

Following introduction of the opposed edge portions of the side wall members into the slot structures of the top and bottom structural members, the same are subjected to inward pressure generally in the vertical direction to hold such members assembled while they are passing from the aforementioned pressure station 9 to the deforming station 10. At pressure station 9, means are provided for insuring secure interengagement of the respective structural members of the beam assembly with each other and the maintenance of such members interengaged until the same are rigidly interconnected at deforming station 10. In the embodiment shown, such means comprises a series of opposed pairs of upper and lower pressure wheels mounted on the respective upper and lower sections of the machine section.

As noted from FIGS. 1, 5 and 7, three such opposed pairs of pressure wheels are positioned to engage the respective top and bottom structural members of the beam. The pairs of pressure wheels at the top of the machine are designated 101, 102 and 103 while the pairs of pressure wheels at the bottom of the machine are designated 106, 107 and 108. As will be seen from FIG. 7, each of the upper pairs of opposed pressure wheels are supported in depending relationship by a mounting bracket 109 secured to and depending from the top frame member 26 of the upper section of the machine. Similarly, the respective lower pairs of pressure wheels are supported by an upstanding mounting bracket 111 secured to the framework of the lower machine section. Such brackets 109 and 111 are secured to their respective frame members in any suitable fashion, such as by bolting. The spacing between the pressure wheels of each pair is such that a shoulder section of the structural member extrusions 2 and 3 which define the top and bottom members of the beam assembly may pass therethrough. The pressure wheels thus are positioned to exert pressure on the extrusions 2 and 3 to urge the same towards each other in the fashion shown in FIG. 3 and to hold the components of the beam assembly interconnected as the same pass from the pressure station 9 to the deforming station 10.

It will be noted from FIG. 1 that the respective opposed pairs of pressure wheels 101 and 106 are spaced vertically from each other a distance slightly greater than the corresponding spacing of the subsequent pairs 102, 107 and 103, 108 in accordance with the converging path followed by the extrusions 2 and 3 as the same enter the machine.

At the deforming station 10, lateral pressure is applied to the structural members of the beam to join such members together into a unitary assembly. As will be described hereinafter with respect to several embodiments of the beam disclosed herein, such lateral pressure may be applied in various fashions and at various locations, depending upon the particular configuration and construction of the components of the beam being assembled. At station 10, means is provided for deforming preselected segments of the respective structural members into locking engagement with each other.

In the embodiment of the machine shown in FIGS. 1 and 5 through 12, such deforming means is constructed to react with a particular configuration of the beam structural members of the type shown in FIGS. 13 through 15 of the drawings as will be described in greater detail hereinafter. With such an arrangement, the top and bottom structural members 2 and 3 are provided with preformed slot structures within which upper and lower edge portions of the side panel members 4 and 6 are received. Such slot structures are defined by spaced walls which together define an elongated channel therebetween. The deforming means provided for that purpose as seen in FIGS. 7, 10 and 12 comprises rotary mechanism for engaging each of the respective slot structures to deform the same into clamping or locking engagement with the edge portions of the side panels 4 and 6 received within the slot channels defined by the structures.

Referring to FIGS. 8 and 10, such rotary mechanism comprises pairs of opposed upper and lower riveting or stitching wheels 116 and 117 respectively which are mounted on the aforementioned guide shafts 37 and 38 upon which the upper section of the machine is slidably mounted. Such riveting wheels are secured by set screws or the like in predetermined positions on the shafts 37 and 38 in accordance with the dimension in the vertical direction of the beam being formed. Such set screws are received within suitable keyways formed longitudinally in the shafts 37 and 38, as seen in FIG. 12, to permit the adjustment mentioned previously.

The shafts in turn are supported at their lower ends in suitable bearings 118 and 119 mounted on a supporting plate 121 extending between the frame members 22. A second supporting plate 122 is positioned above plate 121 and supports thereon sprocket wheels 123 and 124 by means of which the shafts 37 and 38 are rotated from a suitable power source to be described. Another supporting plate 126 is positioned above plate 122 and bearings 127 and 128 are mounted on the underside of such plate for providing additional support for the shafts 37 and 38.

As noted from FIG. 8 the aforementioned plates 36 and 126 are secured to extend between upright frame supports 130 and 130' bolted or otherwise adjustably secured to the frame member extensions 23 of the lower section of the machine. The aforementioned rivet wheels 116 and 117, as also seen from FIG. 8, are supported by braces 129 and the aforementioned plate 126 in vertically spaced relationship relative to each other in accordance with the size of the beam being assembled.

Interposed between such rivet wheels are pressure roll assemblies 131 and 132 respectively at opposite sides of the machine, each comprised of a pair of pressure wheels 133 and 134 (FIG. 10) which are engaged with and urge inwardly the side wall panels 4 and 6 of the beam. Such pressure roll assemblies are mounted upon and supported by the frame members 130 and 130' in any suitable manner, such as by welding.

Each of the rivet wheels is mounted on the aforementioned upright shafts 37 and 38 for rotation therewith through a keyed interconnection thereof with such shaft. Each such wheel is provided with a series of protuberances or projections 141 provided to deform predetermined segments of the extruded structural members 2 and 3 into locking engagement with the side wall panels 4 and 6 of the beam in the manner described in more detail hereinafter. It will be noted that upon rotation of the shafts 37 and 38 in the direction noted the wheels will draw the interengaged components of the beam assembly through the machine while at the same time joining the same together into a unitary assembly.

Preferably means are provided to back up the pressure exerted by the riveting wheels and such means comprise a pair of spaced back up wheels 142 and 143 positioned at opposite sides of the beam in alignment with each of the respective riveting wheels 116 and 117. The respective back up wheels 142 are mounted as seen in FIG. 8 to project from brackets 144 secured to the respective plates 126 and 36. To assure effective backing up during the riveting operation, two such back up wheels are provided in operative alignment with each riveting wheel and are longitudinally spaced from each other as best seen in FIG. 12.

Referring to FIG. 11, means is provided for simultaneously driving at uniform speeds all of the riveting wheels 116 and 117. Such drive means comprises a variable speed reversible electric motor 151 mounted beneath the framework of the apparatus by means of mounting plate 152, as best seen in FIG. 5. A belt and pulley mechanism 153 is utilized to transmit power from the motor 151 to a gear reducing unit 154. The gear reducer in turn is operatively connected by a pulley train defined by toothed pulleys 156, 157, 158 and 159 to the riveting wheels 116 and 117 mentioned previously. That is, each of the pulley wheels mentioned is engaged via its teeth with a drive chain 161 which passes over the respective pulleys in the fashion seen in FIG. 11.

Pulley wheels 157 and 159 in turn form part of the aforementioned sprockets 123 and 124 with which the drive shafts 37 and 38 as secured as noted. Thus, upon actuation of motor 151, the drive shafts 37 and 38 are rotated in opposite directions to rotate the riveting wheels. In that regard, a suitable operator control 162 is provided at the operator's station as seen in FIG. 5. Such control is electrically connected in known fashion with the motor 151, such motor being of the reversible type so that upon actuation of the control 162 the beam being assembled may be drawn through the machine, or temporarily reversed in its direction of travel, as desired to meet particular manufacturing conditions.

As also seen from FIG. 5, if desired, additional pairs of opposed pressure wheels 162 and 163 may be provided closely adjacent the riveting wheels to engage the extrusions 2 and 3 of the beam to insure that all components of the beam are held tightly together while the same are being riveted into locking engagement with each other.

Following passage of the beam in assembled condition from the station 10, the same passes the second pressure station 11 at which curvature, if desired, may be imparted to the beam assembly. At station 11 are positioned a pair of laterally spaced vertically extending guide rolls 166 and 167 (FIG. 9) between which the beam passes. Such rolls are mounted on suitable shafts which extend upwardly from bearings 168 and 169 mounted on the aforementioned horizontal frame member extensions 23.

Extending laterally between the frame member extensions 23 is a mounting plate 171 with which is adjustably connected a guide roll mounting bracket 172 (FIG. 9) having slots therein through which bolt connectors 173 pass. The slot-bolt connections thus permit vertical adjustment of the bracket 172 relative to plate 171.

Bracket 172 supports thereon a rotatable guide roller 174 over which the base of the beam rides as the same is discharged from the machine.

Positioned oppositely from roller 174 is a pressure roller 176 which is supported by another mounting bracket 177 which in turn is connected by adjustable slot-bolt connectors 178 to a mounting plate 179 secured to the end of the upper frame member 26.

Normally the spacing between the peripheries of rollers 174 and 176 is such that a completed beam assembly may pass therethrough. The spacing of such rollers relative to each other may be altered by the slot-bolt connections to accomodate therebetween beams of varying sizes. Also, the orientation of such rollers relative to the axis of the beam may be altered so that the rolers may be positioned somewhat offset downwardly relative to the longitudinal axis of the beam. By thus locating the upper pressure roller 176 in the downwardly offset position pressure in the downward direction may be applied to the completed beam as the same exits from the machine. Thus, as the beam is being formed, curvature may be imparted thereto to the desired extent for the purpose of compensating for structural loading of the beam when the same is positioned in a building structure or to impart architectural design curvature thereto.

Finally, as noted previously, at cutoff station 12 suitable cutoff means, such as one or more rotary knife members, designated 181 in FIG. 1, may be positioned to sever the side wall panel members 4 and 6 of the beam, and the extrusions 2 and 3 if desired, in accordance with the predetermined length desired for the completed assembly. Such cut off means may be actuated selectively as needed when travel of the beam is temporarily halted, by any suitable power source.

While the machine has been described with respect to the assembly of one particular type of beam construction, it should be understood that, by selective modification of the various pressure means and riveting means, the machine may be adapted easily and readily to accommodate various beam constructions therein.

Reference is now directed to FIGS. 13 through 17, taken in conjunction with FIG. 12 for an understanding of a preferred embodiment of the subject structural beam. In that connection, as noted previously, the beam is comprised of opposed pairs of structural members 2, 3, 4 and 6. As shown in FIG. 17, preferably the side wall panels 4 and 6 are each formed with vertical corrugations positioned in parallel relationship to impart vertical rigidity thereto. The particular size and configuration of such corrugations may vary to meet particular structural needs.

It will be noted from FIG. 13 that the extruded structural members 2 and 3 are identical, but oppositely oriented. Each member includes a central web 201 which separates and integrally interconnects opposed spaced shoulder sections 202 and 203. Such shoulder sections include slot structures 204 and 206 respectively which extend longitudinally along the shoulder sections. The shoulder sections also include outwardly extending flange portions 207 and 208 which terminate in projecting ribs 209 and 211.

The respective slot structures 204 and 206 are defined, as best seen with reference to slot structure 206 in FIG. 14 by a first wall portion 212 which is interposed between and interconnects the central web 201 with its associated shoulder section 203. Such slot structure is further defined by a second wall portion 213, such wall portions defining therebetween an elongated channel 214 extending therealong.

It will be noted that the wall portion 213 is initially formed to extend out of parallel relationship with the inner wall portion 212 to facilitate insertion of the upper edge portion 216 of the associated side wall panel therein. The inner wall portion 212 as best seen in FIG. 14 also is provided with an elongated groove 217 extending the length thereof which preferably is undercut or dove tailed in configuration and communicates with and forms part of the slot structure channel. Additionally, outer wall portion 213 is provided with a pair of spaced guide ribs 218 and 219 which define a recess therebetween which is generally in alignment with the groove 217 in the inner wall portion.

As perhaps best seen from FIG. 15 taken in conjunction with FIG. 12, upon rotation of a riveting wheel 116 in engagement with the slot structures, the outer wall 213 of each slot structure is deformed inwardly and the projections 141 on such wheel form spaced deformed segments 220 in the wall portion 213 which are urged inwardly into the groove 217 formed in the inner wall portion 212. Such deformation is accompanied by deformation of similar segments of an edge portion 216 of the side wall panel engaged in the slot structure as seen in FIG. 16. Thus, the respective components of the beam assembly are riveted or stitched together utilizing their own material so that the need for separate fasteners to effect a secure interconnection between the beam components is obviated.

As seen in FIG. 15, a guide function is performed by the ribs 218 and 219 and 211 of the extruded structural members 2 and 3 as shown therein in conjunction with riveting wheel 117. The function of the back up wheels is also noted in that figure. It should also be understood that the projections 141 on the riveting wheels cause the beam components to be drawn physically through the machine past each of the stations noted.

FIG. 18 shows a modification of the subject beam in which the upper beam structural member, designated 2', is modified in construction to provide a water trough in conjunction therewith. That is, such beam component comprises a deeply recessed central web 201' in which the wall portions 212' which connect the same to the shoulder portions 202 and 203 space the web a substantial distance therefrom. Partial overlying flanges 221 and 222 may be provided to partially close off the water receiving trough 223 defined by the central web 201' and the wall portions 212' thereof.

In assembling the embodiment shown in FIG. 18, the aforementioned guide block 94 which spaces the side wall panels 4 and 6 from each other, as seen in FIG. 7, is removed and the side walls 212' perform the function of such guide blocks as mentioned previously. The water trough is provided to carry off water from a roof structure when the beam is exposed to the elements of nature.

FIG. 19 shows a further modification of a beam structure in which the extruded structural members 2 and 3 have their slot structures further modified by providing a longitudinal rib 226 along the inner surface of the outer wall portion 213 generally in alignment with groove 217 provided in the inner wall portion 212. The presence of such rib, whether longitudinally continuous or discontinuous, further insures inward deformation of an edge portion 216 of a side wall panel of the beam construction into the receiving groove 217 to further insure effective interconnection between the beam components.

A modified embodiment of the side wall panels desirably employed in the subject beam construction is shown in FIGS. 20 and 21 in which a modified means for interconnecting such side wall panels with the metal extrusions is provided. Such arrangement is well suited for use with the extrusion constructed as in FIG. 19 but its use is not restricted to such a combination. In that connection, adjacent the upper margin of the modified side wall panel, designated 231, is formed an expansible elongated male rib 232 which is accordion or M-shaped in cross section as noted in FIG. 20. Upon pressure being applied to the base of rib in the direction of the arrow shown in FIG. 20, the same may be expanded laterally outwardly. Thus, upon such rib being inserted in a groove 217 formed in the wall portion 212 of an extrusion and pressure applied thereto in the manner shown in FIG. 21, such rib may be expanded into such groove to securely lock the side wall panel 231 in place. Such expansion is readily effected by forcing a rib 226 into engagement with the expansible rib 232, such rib 226 being provided as part of the slot structure and being formed therein in alignment with the slot 217.

The arrangement shown in FIGS. 20 and 21 further includes an improved construction by means of which the subject beam employing such side wall panels 231 may be employed to support ceiling structure to be supported by the beam. In that regard, an elongated groove 233 also is formed in the side wall panel member 231 parallel to and spaced inwardly from the expansible rib 232. Thus, as seen in FIG. 21 when a beam employing such a side wall panel structure is utilized to support a roof structure, generally designated 235 in FIG. 21, a space to receive insulating material or the like may be provided below the under surface of the roof 235. That is, by providing a support member 236 having an expansible rib 237 corresponding in configuration to the aforementioned rib 232, such support member 236 may be secured to the side wall member 231 of the beam by expanding the rib 237 in the groove 233 provided therefor. Thus, by securing the opposite end of the support member 236 in any suitable fashion at its opposite edge, such as by engaging the same in another side wall panel of a similar beam structure, a space is provided between the under surface of the roof and the support member which may be filled with insulating material and the like as illustrated at 238 in FIG. 21.

FIGS. 22 and 23 show another modified arrangement similar to that shown in FIG. 20 in which a side wall panel member 241 may be secured to an extruded beam structural member by providing the upper margin of the side wall panel 241 with a generally Z-shaped male expansible rib 242 which may be expanded by applying pressure thereto in the general manner shown by the direction of the arrow in FIG. 23. Such pressure may be applied by a smooth periphery riveting wheel shown in dotted lines at 243 in FIG. 23. With the arrangement shown, an inner wall portion 213 of the receiving slot structure may be omitted as shown, with the groove 217 thus forming the slot structure channel.

FIGS. 24 and 25 show a further modification utilizing a male expansible rib of the type shown at 232 in FIG. 20 which is expanded by utilizing a modified riveting wheel 246 as shown in FIG. 25 in conjunction with a modified back up wheel 247. The modified riveting wheel includes projections 248 at spaced locations on the periphery thereof which deform segments of the rib 232 into the groove 217 of the slot structure of the beam extrusion. In that regard, it will also be noted that the outer wall portion 213 of such slot structure is omitted from the arrangement shown in FIGS. 24 and 25 so that the riveting wheel 246 may come in direct contact with the male expansible rib as shown.

In addition to the projections 248, the modified riveting wheel further includes a continuous projecting band 251 from which such projections 248 extend. Thus, the projections 248 as shown in FIG. 25 deform segments of wall portion 212 and of the expansible rib 232 at spaced locations, the band 251 also deforms the expansible rib 232 into the receiving groove 217 continuously along its length into the groove 217. To accomodate such inward deformation caused by the projections 248, the modified back up wheel 247 is provided with suitably spaced recesses 252 to receive therein the deformed segments of the wall portion 212 and rib 232 as seen in FIG. 25.

Thus, it is seen that the structural members of a beam embodying this invention may be interconnected in secure engagement by deforming wall portions of the slot structures to clamp a portion of the side wall panels therein in the fashion shown in FIGS. 13 through 21 or, alternatively, the side wall panels of the beam may be deformed directly into the channels of the slot structures of the extruded structural members in the fashion shown in FIGS. 22 through 25.

Preferably the side wall panels of the beam are provided with a decorative motiff, such as a wood grain effect available on aluminum sheet metal rolls on the market today. To further enhance the decorative appearance of a beam utilizing such a decorative motiff, a harmonizing pattern may be applied to an extruded member 2 or 3 by utilizing a decorative cover panel thereon. Such a panel, designated 256, may be slidably received or positioned to cover the metal extrusion with which the side wall panels are engaged as seen in FIG. 26. By utilizing one or more decorative panels 256, all visible areas of a beam when the same is positioned in a building structure may be made to harmonize in deisgn motiff to produce a very attractive assembly.

Similarly, as seen in FIG. 27, for those ends of the beam which may be visible in a given building structure, an end cap, designated 261, may be positioned in engagement with the side wall panels of the beam. Such an end cap may be formed from a suitable section of metal extrusion which is positioned over and interengaged with the end margins of the respective side wall panels 4 and 6 to close off the end of the beam. Some hand trimming of such an end cap from a section of metal extrusion is normally required to adapt the same to fit in place, but such trimming may be easily effected at the job site to produce the finished decorative effect desired.

Having thus made a full disclosure of preferred embodiments of the subject improved beam construction and a machine and method for manufacturing the same, reference is directed to the appending claims for the scope of protection to be afforded thereto.

I claim:

1. Apparatus for forming a structural unit defined by opposed pairs of structrual members a first pair of which have preformed slot structures extending longitudinally along opposite margins thereof to receive therein edge portions of the members of a second pair thereof; said apparatus comprising guide means for receiving said pairs of members from supplies thereof and orienting the same in opposed relationship to each other; means for drawing said aligned pairs of members into engagement with each other and inserting edge portions of the members of said second pair into the slot structures of said first pair; and means for deforming segments of the members of at least one of said pairs into locking engagement with the members of the other of said pairs, whereby said pairs of members may be securely interconnected into an integral structural unit.

2. The apparatus of claim 1 which further includes first means for supporting predetermined lengths of the members of said first pair of said members, and other means for supporting substantially continuous supplies of the members of said second pair of said members; said respective supporting means being positioned in advance of said guide means.

3. The apparatus of claim 1 in which said means for deforming said member segments comprises rotary mechanism for substantially simultaneously engaging said members to be deformed.

4. The apparatus of claim 3 which further includes back up means positioned on opposite sides of said members to be deformed relative to said rotary mechanism.

5. The apparatus of claim 3 in which said rotary mechanism comprises a plurality of rotating wheels positioned to engage said respective members to be deformed, each of said wheels having projections thereon for engaging said members to be deformed to effect such deformation.

6. The apparatus of claim 1 in which said guide means includes guide structure for receiving said pairs of members from supplies thereof and bringing the same together in a converging path to facilitate interfitting edge margins of said second pair of members into the slot structures of said first pair of members.

7. The apparatus of claim 6 which further includes pressure means for positiveily retaining said members interfitted as they pass from said guide structure to said means for deforming said segments.

8. The apparatus of claim 5 in which each of said wheels has peripherally spaced projections thereon, whereby said members are riveted together by spaced segments deformed therefrom as said wheels rotate thereagainst.

9. Apparatus for forming a structural unit defined by opposed pairs of structural members a first pair of which have preformed slot structures extending longitudinally along opposite margins thereof to receive therein edge portions of the second pair thereof; said apparatus comprising guide means for receiving said pairs of members from supplies thereof and orienting the same in opposed relationship to each other; means for drawing said aligned pairs of members into engagement with each other and inserting the edge portions of said second pair of members into the slot structures of said first pair of members; and means for deforming segments of said respective slot structures of said first pair of members into locking engagement with said edge portions of the members of said second pair of members, whereby said edge portions of second pairs of members are securely clamped in said slot structures and said pairs of members are joined securely into an integral structrual assembly.

10. The apparatus of claim 9 which further includes first means for supporting predetermined lengths of said first pair of said members, and other means for supporting substantially continuous supplies of the members of said second pair of said members; said respective supporting means being positioned in advance of said guide means.

11. The apparatus of claim 9 in which said deforming means comprises rotary mechanism for substantially simultaneously engaging said respective slot structure of said members of said first pair and deforming the same inwardly at predetermined locations therealong.

12. The apparatus of claim 11 in which said rotary mechanism comprises a plurality of rotating wheels positioned to engage said respective slot structures simultaneously as said pairs of members pass through said apparatus, each of said wheels having projections thereon, said projections deforming said slot structures at said predetermined locations to clamp said members of said second pair in the slot structures of the members of said first pair.

13. The apparatus of claim 12 which includes back up means oriented to support said respective slot structures from the sides thereof opposite from said respective wheels during deformation of said slot structures.

14. The apparatus of claim 9 which further includes pressure means adjacent the discharge end of said apparatus against which a completed length of a structural unit passes, said pressure means applying pressure to such completed unit to impart a predetermined amount of curvature thereto.

15. The apparatus of claim 10 which further includes cut off means adjacent the discharge end of said apparatus for severing the structural members of said second pair after assembly of said pairs of members into a structural unit, whereby such unit may be discharged from said apparatus in a predetermined length.

16. The apparatus of claim 12 in which said projections on said wheels are peripherally spaced from each other, whereby said slot structures are deformed at spaced locations therealong.

17. Apparatus for forming a structural unit comprising a first structural member, and a pair of second structural members to be interconnected by said first structural member, said first member having preformed slot structures extending longitudinally along opposite margins thereof to receive therein edge portions of the members of said pair of second structural members; said apparatus comprising guide means for receiving said first member and said members of said pair of second members from supplies thereof and orienting the same in adjacent relationship to each other; means for drawing said first member and said members of said pair of second members into engagement with each other and inserting the edge portions of the members of said pair of second members into the slot structures of said first member; and means for deforming spaced segments of said respective slot structures of said first member into locking engagement with said edge portions of said members of said pair of second members, whereby said edge portions of said members of said pair of second members are securely clamped in said slot structures and said first and second members are securely joined into an integral structural assembly.

18. The apparatus of claim 17 which further includes first means for supporting predetermined lengths of members defining said first member, and other means for supporting substantially continuous supplies of the members of said pair of second members; said respective supporting means being positioned in advance of said guide means.

19. The apparatus of claim 17 in which said deforming means comprises rotary mechanism for substantially simultaneously engaging said respective slot structures of said first member and deforming the same inwardly at predetermined spaced locations therealong.

20. The apparatus of claim 19 in which said rotary mechanism comprises at least two rotating wheels positioned to engage said respective slot structures of said first member simultaneously as said first member and said members of said pair of second members pass through said apparatus, each of said wheels having projections thereon, said projections deforming said slot structures at said predetermined locations to clamp said members of said pair of second members in the slot structures of said first member.

21. The apparatus of claim 20 which further includes back up means oriented to support said respective slot structures of said first member from the sides thereof opposite from said respective wheels during deformation of such slot structures.

22. The apparatus of claim 17 which further includes pressure means adjacent the discharge end of said apparatus against which a completed length of a structural unit passes, said pressure means applying pressure to said unit to impart a predetermined amount of curvature thereto.

23. The apparatus of claim 18 which further includes cut-off means adjacent the discharge end of said apparatus for severing the members of said pair of second members after assembly of said first member and said pair of second members into a structural unit, whereby such unit may be discharged from said apparatus in a predetermined length.

24. The apparatus of claim 20 in which said projections on said wheels are peripherally spaced from each other whereby said slot structures are deformed at spaced locations longitudinally therealong.

25. The apparatus of claim 17 in which said guide means includes guide structure for receiving said first member and said members of said pair of second members from supplies thereof and bringing the same together in converging paths to facilitate interfitting the edge portions of said members of said pair of second members into the slot structures of said first member.

26. The apparatus of claim 25 which further includes pressure means for positively retaining said first member and said members of said pair of second members interfitted as they pass from said guide structure to said means for deforming said segments.

27. Apparatus for forming a structural unit comprising a pair of first structural members each of which has a preformed slot structure extending longitudinally along a margin thereof, and a second structural member to interconnect said first pair of members, said second member having opposite edge portions to be received in said slot structures of said members of said pair of first members; said apparatus comprising guide means for receiving said members of said pair of first members and said second member from supplies thereof and orienting the same in adjacent relationship to each other; means for drawing said members of said pair of first members and said second member into engagement with each other and inserting the edge portions of said second member into the respective slot structures of said members of said pair of first members; and means for deforming spaced segments of said respective slot structures of said members of said pair of first members into interlocking engagement with said opposite edge portions of said second member, whereby said edge portions of said second member are securely clamped in said slot structures and said pair of first members and said second member are securely joined into an integral structural assembly.

28. The apparatus of claim 27 which further includes first means for supporting predetermined lengths of the members defining said first pair of members, and other means for supporting a substantially continuous supply of said second member; said respective supporting means being positioned in advance of said guide means.

29. The apparatus of claim 27 in which said deforming means comprises rotary mechanism for substantially simultaneously engaging said respective slot structures of said members of said pair of first members and deforming the same inwardly at predetermined spaced locations therealong.

30. The apparatus of claim 29 in which said rotary mechanism comprises at least two rotating wheels positioned to engage said respective slot structures of the members of said pair of first members simultaneously as said first members and said second member pass through said apparatus, each of said wheels having projections thereon, said projections deforming said slot structures at said predetermined locations to clamp said second member in the slot structures of said members of said pair of first members.

31. The apparatus of claim 30 which further includes back up means oriented to support said respective slot structures of said first members from the sides thereof opposite from said respective wheels during deformation of such slot structures.

32. The apparatus of claim 27 which further includes pressure means adjacent the discharge end of said apparatus against whih a completed length of a structural unit passes, said pressure means applying pressure to said unit to impart a predetermined amount of curvature thereto.

33. The apparatus of claim 28 which further includes cut-off means adjacent the discharge end of said apparatus for severing said second member from the supply thereof after assembly of said first members and said second member into a structural unit, whereby such unit may be discharged from said apparatus in a predetermined length.

34. The apparatus of claim 30 in which said projections on said wheels are peripherally spaced from each other whereby said slot structures are deformed at spaced locations longitudinally therealong.

35. The apparatus of claim 27 in which said guide means includes guide structure for receiving said members of said pair of first members and said second member from supplies thereof and bringing the same together in converging paths to facilitate interfitting the edge portions of said second member into the slot structures of said first members.

36. The apparatus of claim 35 which further includes pressure means for positively retaining said members of said pair of first members and said second member interfitted as they pass from said guide structure to said means for deforming said segments.

37. Apparatus for forming a structural unit comprising two structural members the first of which has a preformed deformable slot structure defined by opposed wall portions extending longitudinally thereof to receive therein an edge portion of the second member; said apparatus comprising guide means for receiving said members from supplies thereof and orienting the same in adjacent relationship to each other; means for drawing said first and second members into engagement with each other and inserting the edge portion of said second member into the slot structure of said first member; and means for deforming spaced segments of said slot structure of said first member into locking engagement with said edge portion of said second member, such deformation being effected at spaced longitudinal locations along the length of said slot structure, whereby said edge portion of said second member is securely clamped in said slot structure of said first member and said members are joined securely together thereby into an integral structural assembly.

38. The apparatus of claim 37 which further includes first means for supporting predetermined lengths of said first member, and other means for supporting a substantially continuous supply of said second member; said respective supporting means being positioned in advance of said guide means.

39. The apparatus of claim 37 in which said deforming means comprises rotary mechanism for engaging said slot structure of said first member and deforming the same inwardly into interlocking engagement with said edge portion of said second member.

40. The apparatus of claim 39 in which said rotary mechanism comprises at least one rotating wheel positioned to engage said slot structure as said first and second members pass through said apparatus, said wheel ahving projections thereon for deforming said slot structure at said predetermined locations to clamp said edge portion of said second member in the slot structure of said first member.

41. The apparatus of claim 40 which includes back up means oriented to support said slot structure from the side thereof opposite from said rotating wheel during deformation of such slot structure.

42. The apparatus of claim 37 which further includes pressure means adjacent the discharge end of said apparatus against which a completed length of a structural unit passes, said pressure means applying pressure to said completed unit to impart a predetermined amount of curvature thereto.

43. The apparatus of claim 38 which further includes cut-off means adjacent the discharge end of said apparatus for severing said second structural member from the supply thereof after assembly of said first and second members into a structural unit, whereby such unit may be discharged from said apparatus in a predetermined length.

44. The apparatus of claim 40 in which said projections on said wheel are peripherally spaced from each other, whereby said slot structure is deformed at spaced locations longitudinally therealong.

45. The apparatus of claim 37 in which said guide means includes guide structure for receiving said first and second members from supplies thereof and bringing the same together in converging paths to facilitate interfitting said edge margin of said second member into the slot structure of said first member.

46. The apparatus of claim 45 which further includes pressure means for positively retaining said first and second members interfitted as they pass from said guide structure to said guide means for deforming said segments.

* * * * *